United States Patent [19]

Nakae

[11] Patent Number: 5,391,693
[45] Date of Patent: Feb. 21, 1995

[54] PROCESS FOR PRODUCING A POLYCARBONATE COPOLYMER

[75] Inventor: Mitsugu Nakae, Ichihara, Japan

[73] Assignee: Idemitsu Petrochemical Co., Ltd., Tokyo, Japan

[21] Appl. No.: 130,359

[22] Filed: Oct. 1, 1993

[30] Foreign Application Priority Data

Oct. 9, 1992 [JP] Japan .................. 4-271711
Nov. 12, 1992 [JP] Japan .................. 4-302358

[51] Int. Cl.$^6$ ................................. C08G 64/00
[52] U.S. Cl. ......................... 528/201; 528/171; 528/174; 528/196; 528/202; 528/204
[58] Field of Search ............. 528/201, 202, 204, 196, 528/171, 174

[56] References Cited

U.S. PATENT DOCUMENTS

3,546,165  12/1970  Morgan ............................ 528/201

FOREIGN PATENT DOCUMENTS

3182336  7/1988  Japan ............................... 528/201

*Primary Examiner*—John Kight, III
*Assistant Examiner*—Terressa Mosley
*Attorney, Agent, or Firm*—Frishauf, Holtz, Goodman & Woodward

[57] ABSTRACT

A polycarbonate copolymer having a desirable heat resistance and impact resistance, and a process for producing the copolymer. The polycarbonate copolymer comprises a carbonate structural unit of the formula (I):

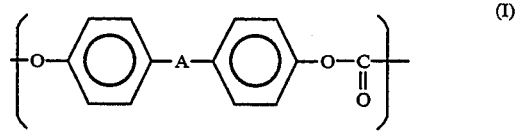

wherein A is alkylidene, alkylene, arylene, arylalkylene, —O—, —S—, —SO$_2$— or a single bond, and a carbonate structural unit of formula (II):

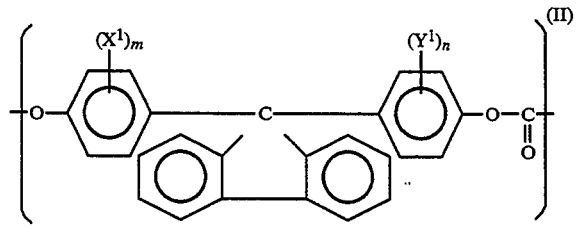

wherein X$^1$ and Y$^1$ are hydrogen, halogen or an organic group and m and n are 1 to 4, wherein the proportion of the carbonate structural unit of the formula (II) being 2 to 15 mole % based on the amount of the carbonate structural unit of the formulas (I) and (II), and the viscosity average molecular weight of the copolymer being 15,000 to 40,000. The polycarbonate copolymer is produced by an interfacial polycondensation of an aromatic diol and a fluorene compound, with phosgene or a phosgene derivative in the presence of methylene chloride as an inert organic solvent, the fluorene derivative being in the form of aqueous solution in potassium hydroxide.

11 Claims, 1 Drawing Sheet

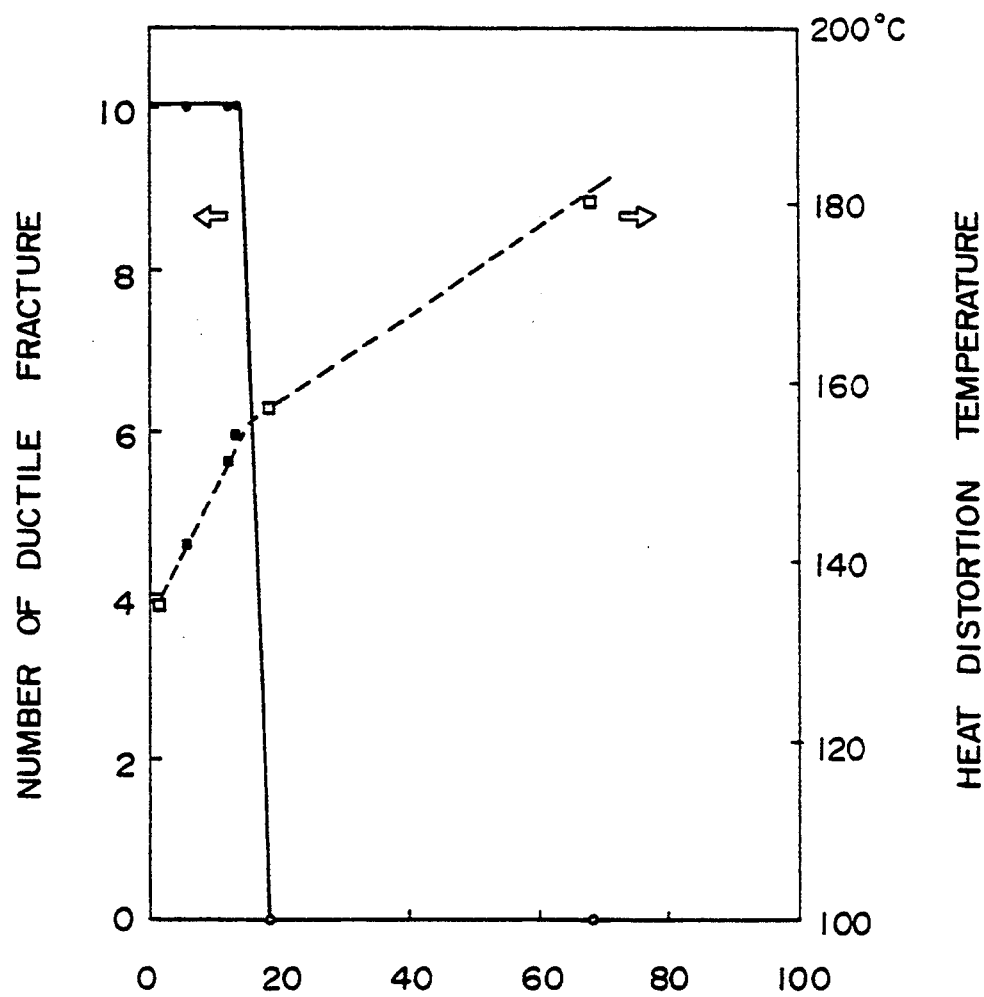

PROCESS FOR PRODUCING A POLYCARBONATE COPOLYMER

BACKGROUND OF THE INVENTION

1. Field of the Invention

The present invention relates to a polycarbonate copolymer and a process for producing the same. More particularly, it pertains to polycarbonates excellent in heat resistance and impact resistance, and suitably used for optical parts, mechanical parts, electric and electronic parts, and automotive parts; among said polycarbonate copolymers, a polycarbonate particularly excellent in thermostability at molding and free from problems such as rust on the die (die rust) at molding; and further a process for efficiently producing these polycarbonate copolymers.

2. Description of the Related Arts

It has been known that a polycarbonate copolymer containing 9,9-bis(4-hydroxyphenyl)fluorene has a high heat resistance (U.S. Pat. No. 3546165).

However, polycarbonates containing 9,9-bis(4-hydroxyphenyl) fluorene are low in impact resistance, and it is eagerly wished for their improvement.

As a polycarbonate having an improved impact resistance, a block copolymer with siloxane, for instance, is known (J. Appl. Polym. Sci. Vol.20, P-3275, 1976). Said polycarbonate copolymer with siloxane is, however, expensive and not so useful in industrial use, and its improvement over previous polycarbonates is not so remarkable.

On the other hand, when a polycarbonate copolymer containing 9,9-bis(4-hydroxyphenyl)fluorene is produced by the interfacial polycondensation, usually it is not preferable to use a sodium hydroxide aqueous solution and methylene chloride. This is because 9,9-bis(4-hydroxyphenyl)fluoreneare not so soluble in any of sodium hydroxide aqueous solution and methylene chloride, and therefore the 9,9-bis(4-hydroxyphenyl)-fluorene is hard to be polymerized. Accordingly, such a method brings a poor efficiency in production. Moreover, with the polycarbonate obtained by that method, the reaction does not proceed sufficiently so that phenolic terminal hydroxyl groups and unreacted chloroformate groups are liable to remain. Therefore, the thermostability at molding of said polycarbonate is very poor.

On the other hand, attempts have been made to use 1,2-dichloroethane to dissolve 9,9-bis(4-hydroxyphenyl)fluorene well (U.S. Pat. No. 3546165, and the Japanese Patent Application Laid-Open No. 182336/1989 ) or to use chloroform for producing the above-mentioned copolymer. These solvents are, however, industrially expensive, and remain in the polymer after the polymer is isolated, causing thermal deterioration of the polymer or die rust at molding.

SUMMARY OF THE INVENTION

The object of the present invention is to overcome the above-mentioned problems in the polycarbonate copolymer itself, and to provide a polycarbonate copolymer excellent in heat resistance and impact resistance.

The another object of the present invention is to overcome the above-mentioned problem in the process for producing a polycarbonate copolymer containing fluorene derivative, to provide a process for efficiently producing said polycarbonate copolymer, and at the same time to provide the polycarbonate copolymer excellent in thermostability at molding, and free from problem such as die rust at molding.

Under these circumstances, the present inventor repeated intensive studies to attain these objects.

As the result, it has been found that a polycarbonate copolymer, obtained by introducing a certain amount of carbonate structural unit derived from fluorene derivative into the main chain having a carbonate structural unit derived from bisphenol A, is excellent in heat resistance and impact resistance.

The present inventor also found that by using a potassium hydroxide aqueous solution of a fluorene derivative, and methylene chloride as a chlorine-based solvent, a high quality polycarbonate copolymer excellent in thermostability at molding and free from die rust at molding can be obtained efficiently.

The present invention has been accomplished based on these findings.

That is, the present invention provides a polycarbonate copolymer which comprises a main chain comprising a carbonate structural unit represented by the general formula (I):

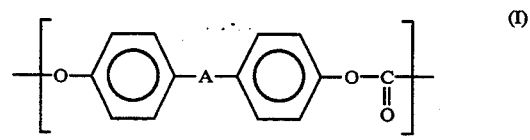

wherein A is an alkylidene group having 1 to 15 carbon atoms, an alkylene group having 1 to 15 carbon atoms, an arylene group having 6 to 15 carbon atoms, an arylalkylene group having 7 to 15 carbon atoms, —O—, —S—, —SO$_2$— or a single bond, and a carbonate structural unit represented by the general formula (II):

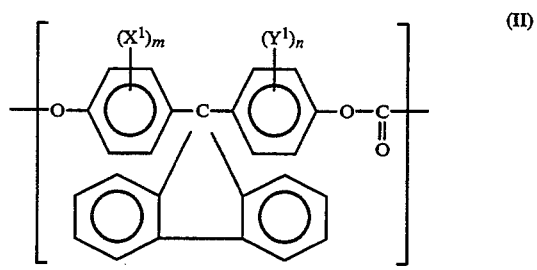

wherein $X^1$ and $Y^1$ are independently a hydrogen atom, a halogen atom or an organic group having 1 to 8 carbon atoms, and m and n are independently an integer of 1 to 4, the proportion of said carbonate structural unit of the formula (II) being 2 to 15 mol % based on the total amount of the carbonate structural unit of the formula and the carbonate structural unit of the formula (II), and which copolymer has a viscosity average molecular weight of 15,000 to 40,000.

The present invention also provides a fluorene derivative-containing polycarbonate copolymer in which the amount of residual chlorine-based solvent (residual chlorine-based solvent amount) is 200 ppm or less.

The present invention further provides a process for producing a polycarbonate copolymer which process comprises interfacial polycondensating an aromatic diol represented by the general formula (III):

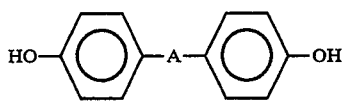

wherein A is an alkylidene group having 1 to 15 carbon atoms, an alkylene group having 1 to 15 carbon atoms, an arylene group having 6 to 15 carbon atoms, an arylalkylene group having 7 to 15 carbon atoms, —O—, —S—, —SO$_2$— or a single bond, and a 9,9-bis(4-hydroxyphenyl)fluorene derivative represented by the general formula (IV):

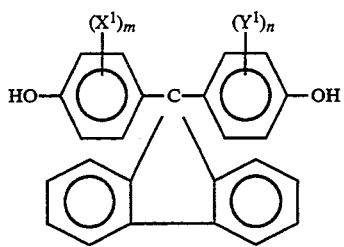

wherein $X^1$ and $Y^1$ are independently a hydrogen atom, a halogen atom, or an organic group having 1 to 8 carbon atoms; m and n are independently an integer of 1 to 4, with phosgene or phosgene derivative in the presence of methylene chloride as an inert organic solvent, said fluorene derivative being in the form of an aqueous solution in potassium hydroxide, said polycarbonate copolymer having a main chain comprising a carbonate structural unit represented by the general formula (I):

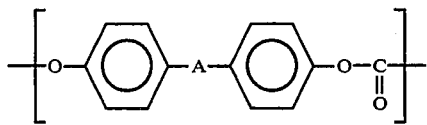

wherein A is as defined in the general formula (III), and a carbonate structural unit represented by the general formula (II):

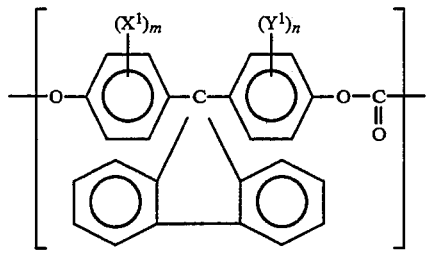

wherein $X^1$, $Y^1$, m and n are as defined in the general formula (IV).

BRIEF DESCRIPTION OF THE DRAWING

The figure is a graph showing the relations among 9,9-bis(4-hydroxyphenyl)fluorene content, heat resistance and impact resistance in the Examples and Comparative Examples.

DESCRIPTION OF PREFERRED EMBODIMENT

In producing the polycarbonate copolymer of the present invention, an aromatic diol (so-called hisphenol) represented by the general formula (III):

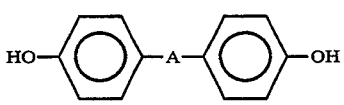

wherein A is as defined above, and a 9,9-bis(4-hydroxyphenyl)fluorene derivative (hereinafter sometimes abbreviated to "fluorene derivative") represented by the general formula (IV):

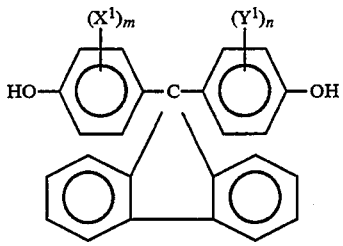

wherein $X^1$, $Y^1$, m and n are as defined above, are used as the starting materials.

Herein, the aromatic diols represented by the general formula (III) include various ones. Specific examples are bis (4-hydroxyphenyl)methane,
1,1-bis(4-hydroxyphenyl)ethane,
2,2-bis(4-hydroxyphenyl)propane (so-called bisphenol A),
2,2-bis(4-hydroxyphenyl)butane,
2,2-bis(4-hydroxyphenyl)octane,
2,2-bis(4-hydroxyphenyl)phenylmethane,
1,1-bis(4-hydroxyphenyl)cyclopentane,
1,1-bis(4-hydroxyphenyl)cyclohexane,
1,1-bis(4-hydroxyphenyl)-3,3,5-trimethylcyclohexane,
4,4-dihydroxydiphenylether,
4,4-dihydroxydiphenylsulfone,
4,4-dihydroxydiphenylsulfide, and 4,4-dihydroxybiphenol.

Among these aromatic diols, 2,2-bis(4-hydroxyphenyl)propane (so-called bisphenol A) is preferably used. These aromatic diols may be used singly, or two kinds or more of them may be used in combination.

The fluorene derivative represented by the general formula (IV) include various ones. $X^1$ and $Y^1$ in the general formula (IV) independently indicates a hydrogen atom, a halogen atom or an organic group having 1 to 8 carbon atoms, and may be identical to or different from each other. Therein, examples of organic groups having 1 to 8 carbon atoms are alkyl groups such as methyl group, ethyl group, propyl group, butyl group, pentyl group, hexyl group, heptyl group, and octyl group; and alkoxyl groups such as methoxyl group, ethoxyl group, propyloxyl group, butyloxyl group, pentyloxyl group, hexyloxyl group, heptyloxyl group, and octyloxyl group.

Specific examples of fluorene derivatives represented by the general formula (IV) are 9,9-bis(4-hydroxyphenyl)fluorene, and 9,9-bis(4-hydroxy-3,5-dimethylphenyl)fluorene. Of these fluorene derivatives, preferably used is a 9,9-bis(4-hydroxyphenyl) fluorene in which both $X^1$ and $Y^1$ are hydrogen atoms. These fluorene derivatives may be used singly, or two kinds or more of them may be used in combination.

The polycarbonate copolymer of the present invention can be produced by the method conventionally employed for producing usual polycarbonates, for example, the interfacial polycondensation method using phosgene or a phosgene derivative and the transesterification method (the melt method). Of these methods, the interfacial polycondensation method is preferred.

The interfacial polycondensation method using phosgene or phosgene derivative includes, for example, the method wherein a polycarbonate oligomer of aromatic diol is previously prepared from aromatic diol and phosgene or phosgene derivative, or a polycarbonate oligomer of fluorene derivative has been prepared from fluorene derivative and phosgene or phosgene derivative, then the solution of these oligomers in an inert organic solvent is reacted with an aqueous alkali solution containing an aromatic diol and a fluorene derivative in a prescribed ratio; or the method wherein phosgene or phosgene derivative is introduced to a mixture of an aqueous alkali solution containing an aromatic diol and a fluorene derivative in a prescribed ratio and inert organic solvent to react them. Of these methods, the former oligomer method is preferred.

The above-mentioned phosgene or phosgene derivatives include, for example, phosgene, triphosgene, bromophosgene, bis(2,4,6-trichlorophenyl)carbonate, bis(2,4-dichlorophenyl)carbonate, bis(2-cyanophenyl)carbonate, and trichloromethyl chloroformate, but are not limited thereto.

Next, the process for producing the polycarbonate copolymer of the present invention according to the oligomer method is described as follows.

First, an aromatic diol or a fluorene derivative is dissolved in an aqueous solution of alkali metal hydroxide to prepare an aqueous alkali solution of either one.

Subsequently, into the mixture of the aqueous alkali solution and an inert organic solvent, phosgene or a phosgene derivative is introduced to prepare a polycarbonate oligomer of aromatic diol or fluorene derivative.

Therein, the alkali concentration of said aqueous alkali solution is preferably in the range of 1 to 15% by weight, and the ratio by volume of the organic phase and the aqueous phase is desirably in the range of 5:1 to 1:7, preferably 2:1 to 1:4. The reaction temperature is controlled by cooling with a bath, selected in the range of usually 0° to 50° C., preferably 5 to 40° C., and the reaction time is 15 minutes to 4 hours, preferably 30 minutes to 2 hours.

The degree of polymerization of the polycarbonate oligomer thus obtained is usually 20 or less, preferably 2 to 10.

Subsequently, to the organic phase containing the polycarbonate oligomer thus obtained, an inert organic solvent is added if desired, and the resulting mixture is contacted with an aqueous alkali solution containing the aromatic diol and the fluorene derivative in a prescribed ratio, and subjected to an interfacial polycondensation usually at a temperature ranging from 0° to 50° C., preferably 5° to 40° C., for 10 minutes to 6 hours.

During this reaction, the alkali concentration of said aqueous alkali solution is preferably 1 to 15% by weight, and the ratio by volume of the organic phase and the aqueous phase is desirably in the range of 7:1 to 1:2, preferably 4:1 to 1:1.

The proportions of the aromatic diol and the fluorene derivative to said oligomer are selected so that the total amount of the aromatic diol and the fluorene derivative/chloroformate group in the oligomer may be usually 0.4 to 0.55, preferably 0.45 to 0.5 in molar ratio. The proportion of alkali metal hydroxide to said oligomer is selected so that the alkali metal hydroxide/chloroformate group in the oligomer may be usually 1.0 to 2.0, preferably 1.2 to 1.7 in molar ratio.

Further, in this reaction, terminal stoppers and catalysts can be used if desired. The amount of terminal stoppers should be selected so that the molar ratio of the terminal stopper/chloroformate group in the oligomer may be usually 0.02 to 0.20, preferably 0.04 to 0.17.

The amount of the catalyst is selected so that the molar ratio of the catalyst/chloroformate group in the oligomer may be usually $1.0 \times 10^{-3}$ to $10.0 \times 10^{-3}$, preferably $1.0 \times 10^{-3}$ to $5.0 \times 10^{-3}$.

As terminal stoppers therein, various ones can be used. Specific example of them are monohydric phenols such as phenol, p-cresol, p-t-butylphenol, p-cumylphenol, tribromophenol, nonylphenol, and p-t-octylphenol.

As for catalysts therein, various ones can be used. Specific examples of them are quaternary ammonium salts, quaternary phosphonium salts and tertiary amines. Quaternary ammonium salts include, for example, trimethylbenzylammonium chloride, triethylbenzylammonium chloride, tributylbenzylammonium chloride, trioctylmethylammonium chloride, tetrabutylammonium chloride, and tetrabutylammonium bromide. Quaternary phosphonium salts include, for example, tetrabutylphosphonium chloride, and tetrabutylphosphonium bromide, and tertiary amines include, for example, triethylamine, tributylamine, N,N-dimethylcyclohexylamine, pyridine, and dimethylaniline.

Examples of alkali metal hydroxides to be used in producing the polycarbonate copolymer of the present invention are sodium hydroxide, potassium hydroxide, lithium hydroxide, and cesium hydroxide. Among these alkali metal hydroxides, sodium hydroxide and potassium hydroxide are suitably used. Particularly the polymerization of the fluorene derivative, potassium hydroxide is most suitable.

As inert organic solvents therein, various ones can be used. Examples of these solvents are chlorinated hydrocarbons such as dichloromethane (methylene chloride), chloroform, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene; and acetophenone. These organic solvents may be used singly, or two or more kinds of them may be used in combination. Of these organic solvents, methylene chloride is particularly suitable.

The polymers thus produced are recovered according to the ordinary method, thereby the polycarbonate copolymer of the present invention can be obtained.

The polycarbonate copolymer of the present invention is a novel polycarbonate copolymer comprising as the main chain a carbonate structural unit derived from an aromatic diol represented by the general formula (I), and a carbonate structural unit derived from a fluorene derivative represented by the general formula (II).

In the polycarbonate copolymer of the present invention, the proportion of the carbonate structural unit represented by the general formula (II) is 2 to 15 mol %, preferably 5 to 14 mol % based on the total amount of the carbonate structural unit of the formula (I) and the carbonate structural unit of the formula (II).

The polycarbonate copolymer of the present invention is characterized by having a viscosity average molecular weight of 15,000 to 40,000, preferably 16,000 to 35,000, and being excellent in heat resistance and impact resistance.

In producing the polycarbonate of the present invention, the polycarbonate copolymer can be particularly efficiently produced by using 9,9-bis(4-hydroxyphenyl)-fluorene derivative represented by the general formula (IV) in form of an aqueous solution in potassium hydroxide, in the presence of methylene chloride as an inert organic solvent. Further, the polycarbonate copolymer produced according to that process is excellent in heat resistance and impact resistance, and furthermore is excellent in thermostability at molding because of small content of residual chlorine-based solvent, and is free from die rust during molding.

As methods of using a potassium hydroxide aqueous solution of the fluorene derivative and the methylene chloride as an inert organic solvent, the following four methods are mentioned specifically.

(i) A method of producing polycarbonate copolymer by reacting phosgene or a phosgene derivative in the presence of a potassium hydroxide aqueous solution containing a 9,9-bis(4-hydroxyphenyl) fluorene derivative represented by the general formula (IV) and an aromatic diol represented by the general formula (III), and methylene chloride.

(ii) A method of producing polycarbonate copolymer by reacting phosgene or a phosgene derivative in the presence of a potassium hydrogen aqueous solution containing a 9,9-bis(4-hydroxyphenyl) fluorene derivative represented by the general formula (IV) and methylene chloride to form a polycarbonate oligomer of 9,9-bis(4-hydroxyphenyl)fluorene derivative, and by reacting the resultant polycarbonate oligomer and an aromatic diol represented by the general formula (III).

(iii) A method of producing polycarbonate copolymer by reacting a polycarbonate oligomer formed from an aromatic diol represented by the general formula (III) and a 9,9-bis(4-hydroxyphenyl)fluorene derivative represented by the general formula (IV) in the presence of a potassium hydroxide aqueous solution and methylene chloride.

(iv) A method of producing polycarbonate copolymer by reacting a polycarbonate oligomer formed from an aromatic diol represented by the general formula (III) and a 9,9-bis(4-hydroxyphenyl) fluorene derivative represented by the general formula (IV) in the presence of a potassium hydroxide aqueous solution and methylene chloride to produce a polycarbonate copolymer oligomer, and then reacting the polycarbonate copolymer oligomer with an aromatic diol represented by the general formula (III).

The above four methods of production will be described in more detail as follows.

Method (i)

Method (i) is a method of producing polycarbonate copolymer directly by the interfacial polycondensation by reacting phosgene or a phosgene derivative in the presence of a potassium hydroxide aqueous solution containing the starting fluorene derivative and an aromatic diol and methylene chloride, without forming a polycarbonate oligomer. As a potassium hydroxide aqueous solution to be used therein, usually an aqueous solution having a potassium hydroxide concentration of 1 to 15% by weight is preferably used. The total content of fluorene derivative and aromatic diol in the potassium hydroxide aqueous solution is selected usually in the range of 0.5 to 20% by weight. Further, the amount of methylene chloride is preferably selected so that the ratio by volume of the organic phase and the aqueous phase may be 1/10 to 10/1, preferably ¼ to 4/1. The reaction temperature may be usually around the temperature for cooling on water bath, and the reaction time is usually 10 minutes to 8 hours, preferably 20 minutes to 3 hours.

Method (ii)

Method (ii) is a method of forming a polycarbonate oligomer of the 9,9-bis(4-hydroxyphenyl)fluorene derivative represented by the general formula (IV), subsequently reacting the polycarbonate oligomer with an aromatic diol represented by the general formula (III) to produce a polycarbonate copolymer. Therein, in order to form a polycarbonate oligomer of a fluorene derivative, it is necessary to react phosgene or a phosgene derivative in the coexistence of a potassium hydroxide aqueous solution containing the fluorene derivative with methylene chloride. In that reaction, a potassium hydroxide aqueous solution having a potassium hydroxide concentration of 1 to 15% by weight is usually preferred. The content of the fluorene derivative in the potassium hydroxide aqueous solution is selected usually in the range of 0.5 to 20% by weight. Further, the amount of methylene chloride is desirably selected so that the ratio by volume of the organic phase and the aqueous phase may be 5/1 to 1/7, preferably 2/1 to ¼. The reaction temperature my be usually around the cooling temperature, and the reaction time is usually 15 minutes to 4 hours, preferably 30 minutes to 2 hours. The degree of polymerization of oligomer is 20 or leas, preferably in the range of 2to 10.

Subsequently, the oligomer obtained in the above-mentioned manner and the aromatic diol compound represented by the general formula (III) are reacted. In that reaction, together with said aromatic diol compound, the fluorene derivative represented by the general formula (IV) may be reacted, if required. When the aromatic diol compound only is used, a sodium hydroxide aqueous solution and a potassium hydroxide aqueous solution can be used as the aqueous alkali solution containing said aromatic diol compound. When both the aromatic diol and the fluorene derivative are used, a potassium hydroxide aqueous solution containing both of them, or an aqueous alkali solution containing aromatic diol and a potassium hydroxide aqueous solution containing the fluorene derivative are used. The alkali concentrations of the sodium hydroxide aqueous solution and the potassium hydroxide aqueous solution mentioned above are preferably in the range of 1 to 15% by weight, and the total contents of the fluorene derivative and the aromatic diol in the sodium hydroxide aqueous solution and the potassium hydroxide aqueous solution are usually selected in the range of 0.5 to 20% by weight.

The above-mentioned polycarbonate oligomer is used as an organic phase containing the polycarbonate oligomer and methylene chloride which is obtained at the forming of said oligomer, but if desired, further methylene chloride can be added. The ratio by volume of the organic phase and the aqueous phase is usually selected in the range of 7/1 to ½, preferably 4/1 to 1/1.

The molar ratio of the total content of fluorene derivative and aromatic diol/chloroformate group of the oligomer is desired to be in the range of preferably 0.4 to 0.55, more preferably 0.45 to 0.5.

On the other hand, the molar ratio of the alkali/chloroformate group of the oligomer is preferably in the range of 1.0 to 2.0, more preferably 1.2 to 1.7.

The temperature in the reaction of polycarbonate oligomer with the fluorene derivative and the aromatic diol may be usually around the cooling temperature, and the reaction time is usually 15 minutes to 4 hours, preferably 30 minutes to 3 hours. Method (iii)

Method (iii) is a method of forming the polycarbonate oligomer of the aromatic diol represented by the general formula (III) first, and thereafter reacting the resultant polycarbonate oligomer with a 9,9-bis(4-hydroxyphenyl)fluorene derivative represented by the general formula (IV) to produce a polycarbonate copolymer. The polycarbonate oligomer of the aromatic diol represented by the general formula (III) can be formed according to the same procedure as in Method (ii) except that phosgene or a phosgene derivative is reacted in the coexistence of a sodium hydroxide aqueous solution or a potassium hydroxide aqueous solution containing said aromatic diol, with methylene chloride.

Subsequently, the polycarbonate oligomer thus obtained and the 9,9-bis(4-hydroxyphenyl)fluorene derivative represented by the general formula (IV) are reacted. In that reaction, the aromatic diol represented by the general formula (III) may be reacted with said fluorene derivative, if desired. When the fluorene derivative only is reacted, a potassium hydroxide aqueous solution containing the fluorene derivative is used. When both the fluorene derivative and the aromatic diol are used, a potassium hydroxide aqueous solution containing both of them, or a potassium hydroxide aqueous solution containing said the fluorene derivative and a sodium hydroxide aqueous solution or a potassium hydroxide aqueous solution containing said aromatic diol are used.

The alkali concentration of the aqueous alkali solution, the total content of the fluorene derivative and the aromatic diol in the aqueous alkali solution, and the reaction conditions of polycarbonate oligomer with fluorene derivative and aromatic diol are the same as those in Method (ii).

Method (iv)

Method (iv) is a method of forming a polycarbonate copolymer oligomer of an aromatic diol represented by the general formula (III) and 9,9-bis(4-hydroxyphenyl)fluorene derivative represented by the general formula (IV), subsequently reacting the resultant polycarbonate copolymer oligomer and the aromatic diol represented by the general formula (III) to produce a polycarbonate copolymer.

Said polycarbonate copolymer oligomer can be formed in the same manner as in Method (iii) of producing a polycarbonate copolymer. Specifically, the polycarbonate oligomer of aromatic diol represented by the general formula (III) is formed, thereafter the resultant oligomer and the 9,9-bis(4-hydroxyphenyl)fluorene derivative represented by the general formula (IV) are reacted in the presence of a potassium hydroxide aqueous solution and methylene chloride, thereby the objective polycarbonate copolymer oligomer is obtained.

Next, the polycarbonate copolymer oligomer thus obtained and the aromatic diol represented by the general formula (III) are reacted. Therein, the 9,9-bis(4-hydroxyphenyl)fluorene derivative represented by the general formula (IV) may be reacted together with said aromatic diol, if desired. The reaction of said polycarbonate copolymer oligomer with the fluorene derivative and the aromatic diol can be done in the same manner as in Method (ii).

The polycarbonate copolymer formed according to Methods (i) to (iv) can be recovered from the solution after reaction, according to a conventional method. Specifically, the solution after reaction is separated into an organic phase and an aqueous phase, then the organic phase is washed with an alkali solution, hydrochloric acid, and water successively, thereafter methylene chloride is removed by a proper means to obtain a polymer powder, and subsequently said powder is sufficiently dried to obtain the desired polycarbonate copolymer.

The polycarbonate copolymer of the present invention thus obtained has a residual chlorine-based solvent (methylene chloride) content of 200 ppm or less, and is free from thermal deterioration and die rust during molding.

As described above, the polycarbonate copolymer of the present invention is excellent in heat resistance and impact resistance, and can be suitably used for optical parts, mechanical parts, electric and electronic parts, and automotive parts.

Particularly when the polycarbonate copolymer is produced according to the process of the present invention, a polycarbonate copolymer with a residual chlorine-based solvent content of 200 ppm or less can be efficiently obtained. Of the polycarbonate copolymers of the present invention, those with the residual chlorine-based solvent content of 200 ppm or less are particularly useful since they are excellent in thermostability at molding, and are free from die rust during the molding.

The present invention will be described in greater detail by Preparation Examples, Examples and Comparative Examples.

Preparation Example 1

(Preparation of Aromatic Diol Oligomer)

Into 400 L(=liter) of 5% by weight of sodium hydroxide aqueous solution, 60 kg of bisphenol A was dissolved to prepare a sodium hydroxide aqueous solution of bisphenol A.

Subsequently, the sodium hydroxide aqueous solution of bisphenol A kept at room temperature and methylene chloride were introduced at a flow rate of 138 L/hr and 69 L/hr, respectively, through an orifice plate into a tubular reactor having an inner diameter of 10 mm and a tube length of 10 m. In cocurrent flow therewith, phosgene was blown in at a flow rate of 10.7 kg/hr, and reacted continuously for 3 hours. The tubular reactor used therein consists of a double tube, and cooling water was passed through the jacket to keep the temperature of the reaction solution at 25° C. at exhaustion. The pH of the exhaust solution was adjusted to 10 to 11.

The reaction solution thus obtained was allowed to stand still, and the aqueous phase was separated and removed. Then, 220 L of methylene chloride phase was taken out, further 170 L of methylene chloride was added thereto, and the resulting mixture was sufficiently stirred to obtain an aromatic diol oligomer (concentration: 317 g/L).

The degree of polymerization of the aromatic diol oligomer obtained therein was 3 to 4.

Preparation Example 2

(Preparation of Fluorene Derivative Oligomer)

The procedure of Preparation Example 1 was repeated except that the sodium hydroxide aqueous solution was replaced with 9% by weight potassium hydroxide aqueous solution, and that bisphenol A was replaced with 55 kg of 9,9-bis(4-hydroxyphenyl)fluorene.

The degree of polymerization of the fluorene derivative oligomer obtained therein was also 3 to 4.

Example 1

(i) Preparation of Liquid A

7 L of aromatic diol oligomer, 7.5 L of methylene chloride and 64.4 g (0.43 mol) of p-t-butylphenol (PTBP) were mixed to prepare Liquid A.

(ii) Preparation of Liquid B 512 g (1.46 mol) of 9,9-bis(4-hydroxyphenyl)fluorene and 177 g (0.776 mol) of bisphenol A were dissolved into a KOH aqueous solution (obtained by dissolving 448 g of KOH into 4.7 L of water) to prepare Liquid B.

(iii) To Liquid A, 3 ml of triethylamine was added, and while the mixture was stirred, Liquid B was rapidly added. After 60 minutes of stirring, 7 L of methylene chloride was added as a diluent, then centrifuged. The methylene chloride phase was washed with 0.03N KOH aqueous solution, 0.1N hydrochloric acid, and water in that order.

The methylene chloride phase after washing concentrated, acetone and hexane were added thereto, and allowed to stand still to be crystallized. Thereafter, solvent was removed while stirring to obtain polymer powder.

The polymer powder was dried in $N_2$ stream at 120° C. for 12 hours, and further vacuum-dried at 120° C. for 48 hours.

Tests on Polymer Powder

The resultant polymer powder was analyzed for composition of monomer, and determined for viscosity average molecular weight, and residual chlorine-based solvent amount.

The results of composition analysis of monomer, and determination of viscosity average molecular weight are shown in Table 1. Also the results of determination of the residual chlorine-based solvent amount is shown in Table 3.

The procedures for analysis or determination are as follows.

1) Composition Analysis of Monomer

Analyzed by a high resolution nuclear magnetic resonance (NMR) analyzer.

2) Viscosity Average Molecular Weight (Mv)

The limiting viscosity $[\eta]$ in methylene chloride at 20° C. was determined by the use of Ubbelode's viscometer, and the molecular weight was found according to the following relation.

$$[\eta] = 1.23 \times 10^{-5} \times Mv^{0.83}$$

3) Amount of Residual Chlorine-based Solvent

One gram of pellet was dipped in 5 ml of toluene, sealed in a vial, and extracted at 70° C. for 1 hour. The resultant supernatant was analyzed by gas chromatography.

Conditions

Column: CHROMOSORB 101, 60 to 80 mesh, 3 mm (diameter)×1 m (length)

Temperature: 130° C. (column), 300° C.(injection inlet)

Way of Detection: Electron Capture-type Detector

Carrier: $N_2$ (40 ml/minute )

Tests on Injection-molding Product

The injection-molding product produced from the above-mentioned polymer powder was determined, as the evaluation of quality, for heat resistance, impact resistance, die rust, and thermostability at molding.

The results of determination for heat resistance and impact resistance are shown in Table 2. Also the results of determination for die rust and thermal stability at molding are shown in Table 3.

The ways of determination in the above tests are as follows.

1) Heat Resistance

The resultant polymer powder was pelletized in an extruder, and injection-molded to produce test pieces. The test pieces were determined for high load distortion temperature (in accordance with JIS K 7207 Load Distortion Temperature Test Method A).

2) Impact Resistence

Test pieces formed in the same manner as in the heat resistance test were tested for fracture behaviour (number of ductile fracture/number of tested pieces) under Izod impact strength test (in accordance with JIS K 7110).

3) Die Rust Test

Short-shot molding of 120 shot was performed at 330° C. with an injection-molding machine, and the state of rust on the die after 24 hours was visually evaluated to 5 ranks (larger rank indicates more rust).

4) Evaluation on Thermostability at Molding (YI Value)

Test pieces were formed after the pellets were retained at 330° C. for 30 minutes in an injection-molding machine. The yellowness index (YI value) of the resultant test pieces were determined with Transmission-type photometer in accordance with JIS K 7103-77.

Example 2

The procedure of Example 1 was repeated except that 256 g (0.73 mol) of 9,9-bis(4-hydroxyphenyl)fluorene and 343 g (1.51 mol) of bisphenol A were dissolved into KOH aqueous solution (prepared by dissolving 448 g of KOH into 4.7 L of water) to prepare liquid B.

The resultant polymer powder was analyzed for the composition of monomer, and determined for viscosity average molecular weight. The results are shown in Table 1. Also the injection-molding product was determined for heat resistance and impact resistance. The results are shown in Table 2.

Example 3

The procedure of Example 1 was repeated except that 565 g (1.61 mol) of 9,9-bis(4-hydroxyphenyl)fluorene and 143 g (0.63 mol) of bisphenol A were dissolved into KOH aqueous solution (prepared by dissolving 448 g of KOH into 5.0 L of water) to prepare liquid B.

The resultant polymer powder was analyzed for composition of monomer, and determined for viscosity average molecular weight. The results are shown in Table 1. Also the injection-molding product was determined for heat resistance and impact resistance. The results are shown in Table 2.

Comparative Example 1

The procedure of Example 1 was repeated except that 782 g (2.24 mol) of 9,9-bis(4-hydroxyphenyl)fluorene was dissolved into KOH aqueous solution (prepared by dissolving 448 g of KOH into 9.0 L of water) to prepare liquid B.

The resultant polymer powder was analyzed for the composition of monomer, and determined for viscosity average molecular weight. The results are shown in Table 1. Also the injection-molding product was determined for heat resistance and impact resistance. The results are shown in Table 2.

Comparative Example 2

Procedure of Example 1 was repeated except that 62 g (0.18 mol) of 9,9-bis(4-hydroxyphenyl)fluorene and 469 g (2.06 mol) of bisphenol A were dissolved into KOH aqueous solution (prepared by dissolving 448 g of KOH into 4.7 L of water) to prepare liquid B.

The resultant polymer powder was analyzed for the composition of monomer, and determined for viscosity average molecular weight. The results are shown in Table 1. Also the injection-molding product is determined for heat resistance and impact resistance. The results are shown in Table 2.

Comparative Example 3

(i) Preparation of Liquid A

To 7 L of the above-mentioned fluorene derivative oligomer, 7.5 L of methylene chloride and 43.6 g (0.29 mol) of p-tertiarybutylphenol were added to prepare liquid A.

(ii) Preparation of Liquid B

Into a sodium hydroxide aqueous solution (prepared by dissolving 320 g of NaOH into 4.7 L of water), 510 g (2.24 mol) of bisphenol A was dissolved to prepare liquid B.

(iii) Thereafter, the procedure of Example 1 was repeated.

The resultant polymer powder was analyzed for the composition of monomer, and determined for viscosity average molecular weight. The results are shown in Table 1. Also the injection-molding product was determined for heat resistance and impact resistance. The results are shown in Table 2.

Example 4

(i) Preparation of Liquid C 512 g (1.46 mol) of 9,9-bis(4-hydroxyphenyl)fluorene was dissolved into a KOH aqueous solution (prepared by dissolving 310 g of KOH into 3.6 L of water) to prepare liquid C.

(ii) Preparation of Liquid D

Into a NaOH aqueous solution (prepared by dissolving 83 g of NaOH into 1.1 L of water), 177 g (0.776 mol) of bisphenol A was dissolved to prepare liquid D.

(iii) To liquid A of Example 1, 3 ml of triethylamine was added, and while the mixture was stirred, liquid C was rapidly added. After the mixture was stirred for 20 minutes, liquid D was added thereto. After 40 minutes, 7 L of methylene chloride was added, and post-treated in the same manner as in Example 1 to obtain a polymer powder.

The resultant polymer powder was analyzed for the composition of monomer, and determined for viscosity average molecular weight, and residual chlorine-based solvent amount. The results of analyzing the composition of monomer and determining the viscosity average molecular weight are shown in Table 1. The results of determination of the residual chlorine-based solvent amount are shown in Table 3. Further, the injection-molding product was subjected to the die rust test and determination on thermostability at molding. The results of determination are shown in Table 3.

TABLE 1

| | Composition of monomer(mol %) | | | Viscosity average molecular weight (Mv) |
|---|---|---|---|---|
| | a | b | c | |
| Example 1 | 12.3 | 83.8 | 3.9 | 19,800 |
| Example 2 | 6.1 | 90.0 | 3.9 | 19,900 |
| Example 3 | 13.6 | 82.5 | 3.9 | 19,800 |
| Example 4 | 12.5 | 83.6 | 3.9 | 19,900 |
| Comparative Example 1 | 18.8 | 77.3 | 3.9 | 19,800 |
| Comparative Example 2 | 1.5 | 94.7 | 3.8 | 19,100 |
| Comparative Example 3 | 68.4 | 27.8 | 3.8 | 19,700 | a: 9,9-bis(4-hydroxyphenyl)fluorene
b: bisphenol A
c: PTBP

TABLE 2

| | Heat resistance (°C.) | Impact resistance Number of ductile fracture/number of test pieces |
|---|---|---|
| Example 1 | 151 | 10/10 |
| Example 2 | 142 | 10/10 |
| Example 3 | 154 | 10/10 |
| Comparative Example 1 | 157 | 0/10 |
| Comparative Example 2 | 135 | 10/10 |
| Comparative Example 3 | 180 | 0/10 |

TABLE 3

| | Amount of residual chlorine-based solvent (ppm) | Die rust (rank) | Thermostability at molding (YI) |
|---|---|---|---|
| Example 1 | 10 | 1 | 4.0 |
| Example 4 | 13 | 1 | 3.2 |

In order to check the relations among the content of 9,9-bis(4-hydroxyphenyl)fluorene, and heat resistance and impact resistance, FIG. 1 was made from the results of Table 2. The drawing shows that the polycarbonate copolymer of the present invention is excellent in heat resistance and impact resistance.

What is claimed is:

1. A process for producing a polycarbonate copolymer which process comprises interfacial polycondensating a reaction mixture comprising an aromatic diol of the formula (III):

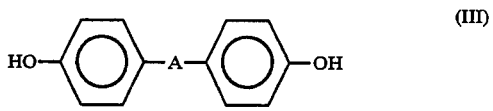

(III)

wherein A is selected from the group consisting of an alkylidene group having 1 to 12 carbon atoms, an alkylene group having 1 to 15 carbon atoms, an arylene group having 6 to 15 carbon atoms, an aryalkylene group having 7 to 15 carbon atoms, —O—, —S— and —SO₂— or A is a single bond, and a 9,9-bis(4-hydroxyphenyl)fluorene compound of the formula (IV):

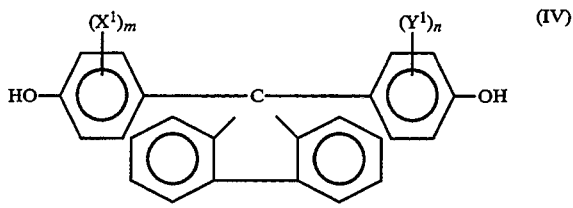

wherein $X^1$ and $Y^1$ are independently selected from the group consisting of a hydrogen atom, a halogen atom and an organic group having 1 to 8 carbon atoms, m and n are independently an integer of 1 to 4,
with phosgene or a phosgene derivative in the presence of methylene chloride as an inert organic solvent, said fluorene compound being in the form of an aqueous solution in potassium hydroxide, said polycarbonate copolymer having a main chain comprising a carbonate structural unit of the formula (I):

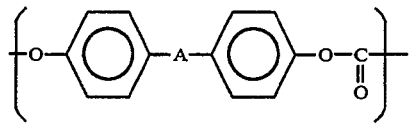

wherein A is as defined for the formula (III), and a carbonate structural unit of the formula (II):

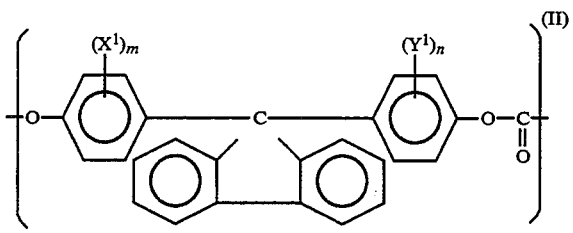

wherein $X^1$, $Y^1$, m and n are as defined for the formula (IV).

2. The process for producing a polycarbonate copolymer according to claim 1 wherein the concentration of potassium hydroxide in the aqueous solution of potassium hydroxide is 1 to 15% by weight.

3. The process for producing a polycarbonate copolymer according to claim 2 wherein the aromatic diol is selected from the group consisting of
bis(4-hydroxyphenyl)methane,
1,1-bis(4-hydroxyphenyl)ethane,
2,2-bis(4-hydroxyphenyl)propane,
2,2-bis(4-hydroxyphenyl)butane,
2,2-bis(4-hydroxyphenyl)octane,
2,2-bis(4-hydroxyphenyl)phenylmethane,
1,1-bis(4-hydroxyphenyl)cyclopentane,
1,1-bis(4-hydroxyphenyl)cyclohexane,
1,1-bis(4-hydroxyphenyl)-3,3,5-trimethylcyclohexane,
4,4-dihydroxydiphenylether,
4,4-dihydroxydiphenylsulfone,
4,4-dihydroxydiphenylsulfide,
4,4-dihydroxybiphenol and combinations thereof;
the fluorene compound is selected from the group consisting of 9,9-bis(4-hydroxyphenyl)fluorene and 9,9-bis(4-hydroxy-3,5-dimethylphenyl)fluorene; the phosgene or phosgene compound is selected from the group consisting of phosgene, triphosgene, bromophosgene, bis(2,4,6-trichlorophenyl)carbonate, bis(2-4-dichlorophenyl)carbonate, bis(2-cyanophenyl)carbonate and trichloromethyl chloroformate; and the polycondensating being carried out at a temperature of 0° to 50° C. for 15 minutes to 4 hours.

4. The process for producing a polycarbonate copolymer according to claim 1 wherein the 9,9-bis(4-hydroxyphenyl) fluorene of the formula (IV) is in an amount in the aqueous solution of potassium hydroxide of 0.5 to 20% by weight.

5. The process for producing a polycarbonate copolymer according to claim 1 wherein phosgene or a phosgene derivative is reacted in the copresence of an aqueous solution of potassium hydroxide containing the 9,9-bis(4-hydroxyphenyl)fluorene compound of the formula (IV), and the aromatic diol of the formula (III), with the methylene chloride.

6. The process for producing a polycarbonate copolymer according to claim 5 wherein the methylene chloride is in an amount of 1/10 to 10/1 in terms of a ratio by volume of an organic phase and an aqueous phase.

7. The process for producing a polycarbonate copolymer according to claim 6 wherein the phosgene or the phosgene derivative is reacted in the copresence of an aqueous solution of potassium hydroxide containing the 9,9-bis(4-hydroxyphenyl)fluorene compound of the formula (IV) with the methylene chloride to form a polycarbonate oligomer of the 9,9-bis(4-hydroxypheny)fluorene compound, and thereafter the resultant polycarbonate oligomer and the aromatic diol of the formula (III) are reacted.

8. The process for producing a polycarbonate copolymer according to claim 1 wherein a polycarbonate oligomer formed from the aromatic diol of the formula (III) and the 9,9-bis(4-hydrophenyl)fluorene compound of the formula (IV) are reacted in the copresence of the potassium hydroxide aqueous solution with the methylene chloride.

9. The process for producing a polycarbonate copolymer according to claim 1 wherein a polycarbonate oligomer formed from the aromatic diol of the formula (III) the 9,9-bis(4-hydroxyphenyl)fluorene compound of the formula (IV) are reacted in the copresence of the potassium hydroxide aqueous solution with the methylene chloride to form a polycarbonate copolymer oligomer, and thereafter the resultant polycarbonate copolymer oligomer and the aromatic diol of the formula (III) are reacted.

10. The process for producing a polycarbonate copolymer according to any of claims 7, 8 or 9 wherein the methylene chloride is in an amount of 5/1 to 1/7 in terms of a ratio by volume of an organic phase comprising the methylene chloride and an aqueous phase comprising the fluorene compound in the form of an aqueous solution in potassium hydroxide.

11. The process for producing a polycarbonate copolymer according to any of claims 7, 8 or 9 wherein in the reaction of the oligomer and the aromatic diol of the formula (III) and the 9,9-bis (4-hydroxyphenyl)fluorene compound of the formed (IV), the methylene chloride used as an organic solvent is in an amount of 7/1 to ½ in terms of a ratio by volume of an organic phase comprising the methylene chloride and an aqueous phase comprising the fluorene compound in the form of an aqueous solution in potassium hydroxide.

* * * * *

UNITED STATES PATENT AND TRADEMARK OFFICE
CERTIFICATE OF CORRECTION

PATENT NO. : 5,391,693
DATED : February 21, 1995
INVENTOR(S) : Nakae

It is certified that error appears in the above-indentified patent and that said Letters Patent is hereby corrected as shown below:

Column 16, line 26 (Claim 7): delete "claim 6" and
           insert --claim 1--.

Signed and Sealed this

Eighteenth Day of June, 1996

Attest:

BRUCE LEHMAN

Attesting Officer     Commissioner of Patents and Trademarks